United States Patent
Meunier

(10) Patent No.: US 8,022,823 B2
(45) Date of Patent: Sep. 20, 2011

(54) SERENDIPITOUS REPAIR OF SHARED DEVICE

(75) Inventor: Jean-Luc Meunier, St Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 367 days.

(21) Appl. No.: 12/164,384

(22) Filed: Jun. 30, 2008

(65) Prior Publication Data

US 2009/0322522 A1    Dec. 31, 2009

(51) Int. Cl.
    G08B 21/00    (2006.01)
(52) U.S. Cl. ..... 340/540; 340/572.1; 340/5.2; 340/5.28; 340/686.6; 705/37; 705/14.19; 705/14.32; 705/14.33; 705/14.36; 380/51
(58) Field of Classification Search .......... 340/540, 340/572.1, 5.21–5.28, 573, 686.1, 686.5, 340/686.6; 705/37, 14.19, 14.32, 14.33, 705/14.36; 380/51
See application file for complete search history.

(56) References Cited

U.S. PATENT DOCUMENTS

| | | | |
|---|---|---|---|
| 5,435,544 A | | 7/1995 | Mandel |
| 5,467,449 A | | 11/1995 | Gauronski et al. |
| 6,133,844 A | * | 10/2000 | Ahne et al. ............... 340/815.45 |
| 6,353,899 B1 | | 3/2002 | Martin et al. |
| 6,457,883 B1 | * | 10/2002 | Silverbrook et al. ........... 400/62 |
| 6,665,085 B1 | | 12/2003 | Edmunds et al. |
| 6,744,998 B2 | * | 6/2004 | McIntyre ....................... 399/81 |
| 6,763,482 B2 | | 7/2004 | Bernklau-halvor |
| 7,173,521 B2 | * | 2/2007 | Yamazaki ..................... 340/442 |
| 7,193,518 B2 | * | 3/2007 | Kiwada et al. ............. 340/572.1 |
| 7,239,979 B1 | | 7/2007 | McComber et al. |
| 7,249,283 B2 | | 7/2007 | Platteter |
| 7,484,731 B2 | * | 2/2009 | Gutierrez-Vazquez et al. ........................ 271/258.04 |
| 7,780,525 B2 | * | 8/2010 | Walker et al. ................... 463/29 |
| 2002/0095576 A1 | * | 7/2002 | Stoltz et al. ................... 713/175 |
| 2002/0116266 A1 | * | 8/2002 | Marshall ......................... 705/14 |
| 2002/0152049 A1 | * | 10/2002 | Lewis ........................... 702/127 |
| 2002/0175825 A1 | * | 11/2002 | Clerk et al. ................. 340/686.6 |
| 2003/0069832 A1 | * | 4/2003 | Czepluch ........................ 705/37 |
| 2003/0079129 A1 | * | 4/2003 | Lindsay ......................... 713/176 |
| 2004/0054586 A1 | * | 3/2004 | Tomita et al. ................... 705/14 |
| 2004/0057743 A1 | * | 3/2004 | McIntyre ........................ 399/81 |
| 2004/0098306 A1 | * | 5/2004 | Fitzpatrick et al. ............. 705/14 |
| 2004/0243467 A1 | * | 12/2004 | Ewell et al. ..................... 705/14 |
| 2005/0008385 A1 | * | 1/2005 | Serizawa ........................ 399/75 |
| 2005/0221887 A1 | * | 10/2005 | Gomes ............................ 463/25 |
| 2007/0002085 A1 | | 1/2007 | Sampath et al. |
| 2007/0003109 A1 | | 1/2007 | Wu et al. |
| 2007/0203769 A1 | * | 8/2007 | Thomas ............................ 705/7 |

(Continued)

OTHER PUBLICATIONS

U.S. Appl. No. 11/522,171, filed Sep. 15, 2006, Sampath, et al.

(Continued)

Primary Examiner — Benjamin C Lee
Assistant Examiner — Quang D Pham
(74) Attorney, Agent, or Firm — Fay Sharpe LLP

(57) ABSTRACT

A system and method for soliciting repairs to an electromechanical device are disclosed. The system includes a signaling device for signaling a need for a repair of an associated electromechanical device. A repair mediator receives information related to an addressable fault with the electromechanical device and causes the signaling device to provide a signal indicating, to a candidate repairer passing by the device, a need for a repair to the device for which a reward is available for performing the repair. The repair mediator provides the reward for a completed repair.

24 Claims, 3 Drawing Sheets

U.S. PATENT DOCUMENTS

| | | |
|---|---|---|
| 2008/0071622 A1* | 3/2008 | Walker et al. .................... 705/14 |
| 2008/0082407 A1* | 4/2008 | Georgiadis et al. ............. 705/14 |
| 2008/0126860 A1* | 5/2008 | Sampath et al. ................. 714/25 |
| 2008/0130882 A1* | 6/2008 | Hagglund et al. ............... 380/51 |
| 2008/0231883 A1* | 9/2008 | Snyder ........................ 358/1.15 |
| 2008/0243606 A1* | 10/2008 | Snyder et al. .................... 705/14 |
| 2009/0295569 A1* | 12/2009 | Corwin et al. ........... 340/539.12 |
| 2010/0121700 A1* | 5/2010 | Wigder et al. ............. 705/14.25 |
| 2011/0075191 A1* | 3/2011 | Meunier et al. .............. 358/1.15 |

OTHER PUBLICATIONS

Michel J. Denber, Zhun Huang, Document Reproduction Machine Incorporating a User Motion Sensor, Xerox Disclosure Journal—vol. 19, No. 1 Jan./Feb. 1994, available at IP.com 000026859D.

* cited by examiner

SERENDIPITOUS REPAIR OF SHARED DEVICE

BACKGROUND

The exemplary embodiment relates to a system and method for influencing repairs to shared devices. It finds particular application in connection with a networked printing system in which several users have access to a common printer and will be described with particular reference thereto. It is to be appreciated, however, that other applications in which one or more devices are shared by several users are also contemplated.

Electromechanical devices, such as printers, commonly suffer minor faults, such as paper jams and running out of consumables, such as paper or toner. These minor problems can usually be corrected by the users of such devices, without the assistance of a local support person or service call. However, when a user is in urgent need for a print or copy job, such as for a meeting, or for completing a project, it may be inconvenient to have to perform the physical repair before the job can be completed. Users often redirect the urgent job to another printer, if one is available, and leave the repair to someone else. Some users are less adept at completing the physical repair than others and may leave the repair to another user, even when the job is not urgent. As a result, when the printer is ultimately repaired, either by another user or the support person, several print jobs may have accumulated and be printed unnecessarily. Additionally, several users may have wasted time sending a job to a non-functional printer. Others may feel penalized because they have to repair a printer that other people, with less urgent jobs, could have attended to. Furthermore, this context is not favorable to a good repair.

INCORPORATION BY REFERENCE

The following references, the disclosures of which are incorporated herein in their entireties by reference, are mentioned:

U.S. application Ser. No. 11/522,171, filed on: Sep. 15, 2006, entitled FAULT MANAGEMENT FOR A PRINTING SYSTEM, by Sampath, et al. discloses an automated system and method for detection and correction of faults in a printing system.

U.S. Pat. No. 6,665,085, entitled SIMULTANEOUS VOICE AND DATA COMMUNICATION FOR DIAGNOSTIC PROCEDURES IN A PRINTING OR COPYING MACHINE, by Edmunds, et al., discloses a system for conveying diagnostic data from a machine, such as a digital copier or printer, to a remote specialist. The system allows simultaneous transfer of diagnostic data and live voice data through the same communication channel.

U.S. Pat. No. 5,435,544, entitled PRINTER MAILBOX SYSTEM SIGNALING OVERDUE REMOVALS OF PRINT JOBS FROM MAILBOX BINS, by Mandel discloses a mailbox system for plural users of an electronic printer which monitors the mailboxes and electronically provides a job removal prompting indicator display signal when the users leave print jobs unremoved from their mailbox bins for too long a time.

U.S. Pat. No. 6,457,883, entitled Interactive printer reward scheme, by Silverbrook, et al., discloses a method to allow a printer's or a user's account to accumulate a credit balance and for all or a portion of this balance to be presented to the corresponding user or users as a collection of "points". If the printer account has a credit balance, then the corresponding points may be redeemed by the user or users for particular products or services.

The following references disclose diagnostic systems for printers: U.S. Pat. No. 7,239,979 by McComber, et al.; U.S. Pat. No. 7,249,283 by Platteter; U.S. Pat. No. 5,467,449 by Gauronski et al.; U.S. Pat. No. 6,353,899 by Martin, et al., U.S. Pat. No. 6,763,482 to Bernklau-halvor. U.S. Pub. No. 2007/0002085 by Meera Sampath, et al.; and U.S. Pub. No. 2007/0003109 by Wencheng Wu, et al.

BRIEF DESCRIPTION

In accordance with one aspect of the exemplary embodiment, a system for soliciting repairs to an electromechanical device is provided. The system includes a signaling device for signaling a need for a repair to an associated electromechanical device and a repair mediator which receives information related to an addressable fault with the electromechanical device and causes the signaling device to provide a signal indicating, to a candidate repairer passing by the electromechanical device, a need for a repair to the device for which a reward is available for performing the repair, the repair mediator providing the reward for a completed repair.

In accordance with another aspect, a computer implemented method for soliciting a repair of an electromechanical device is provided. The method includes automatically detecting an addressable fault with an electromechanical device. In response to the detection, the method includes automatically signaling to persons passing by the electromechanical device to indicate a need for a repair to the electromechanical device for which a reward is available and providing a reward to a person who completes the repair.

DETAILED DESCRIPTION

The exemplary embodiment relates to the repair of shared electromechanical devices and is described with particular reference to a printer. The printer recognizes a fault and proactively looks for people passing by to obtain a repair and offers a reward mechanism to the repairer.

As used herein, a printer can include any device for rendering an image on print media, such as a copier, laser printer, bookmaking machine, facsimile machine, or a multifunction machine, such as one having printing, as well as one or more of copying, faxing, scanning, and emailing capability.

Figure 1:
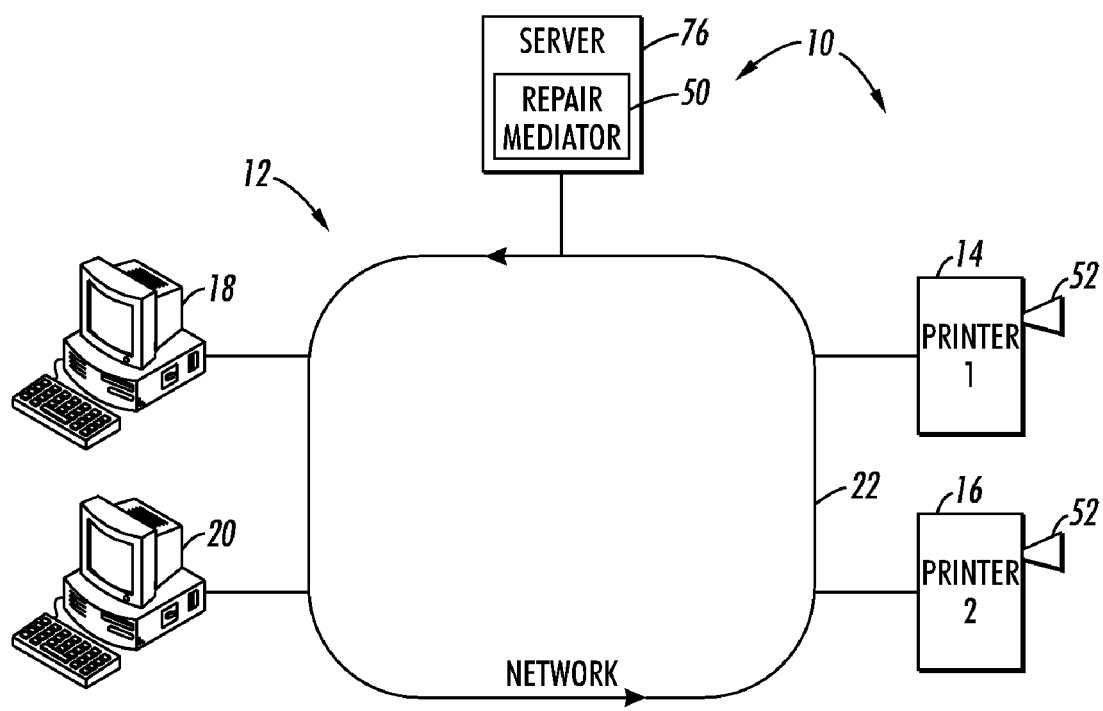
FIG. 1 is a functional block diagram of a network printing system including a system for soliciting a repair in accordance with a first aspect of the exemplary embodiment.

FIG. 1 illustrates a system 10 for soliciting repairs to a printer in the context of a network printing system 12 and for providing an incentive for performing the repair. The printing system 12 includes one or more networked printers 14, 16, that are accessible to a set of users from respective individual workstations 18, 20, via a network 22. The system 10 aims at obtaining a repair from people passing by the location of the printer, in an almost serendipitous way. This is achieved by providing for a printer 14 having a fault to announce its need for a repair and providing an incentive for repairing which is offered to a candidate repairer. Printer 16 may be similarly configured.

Figure 2:
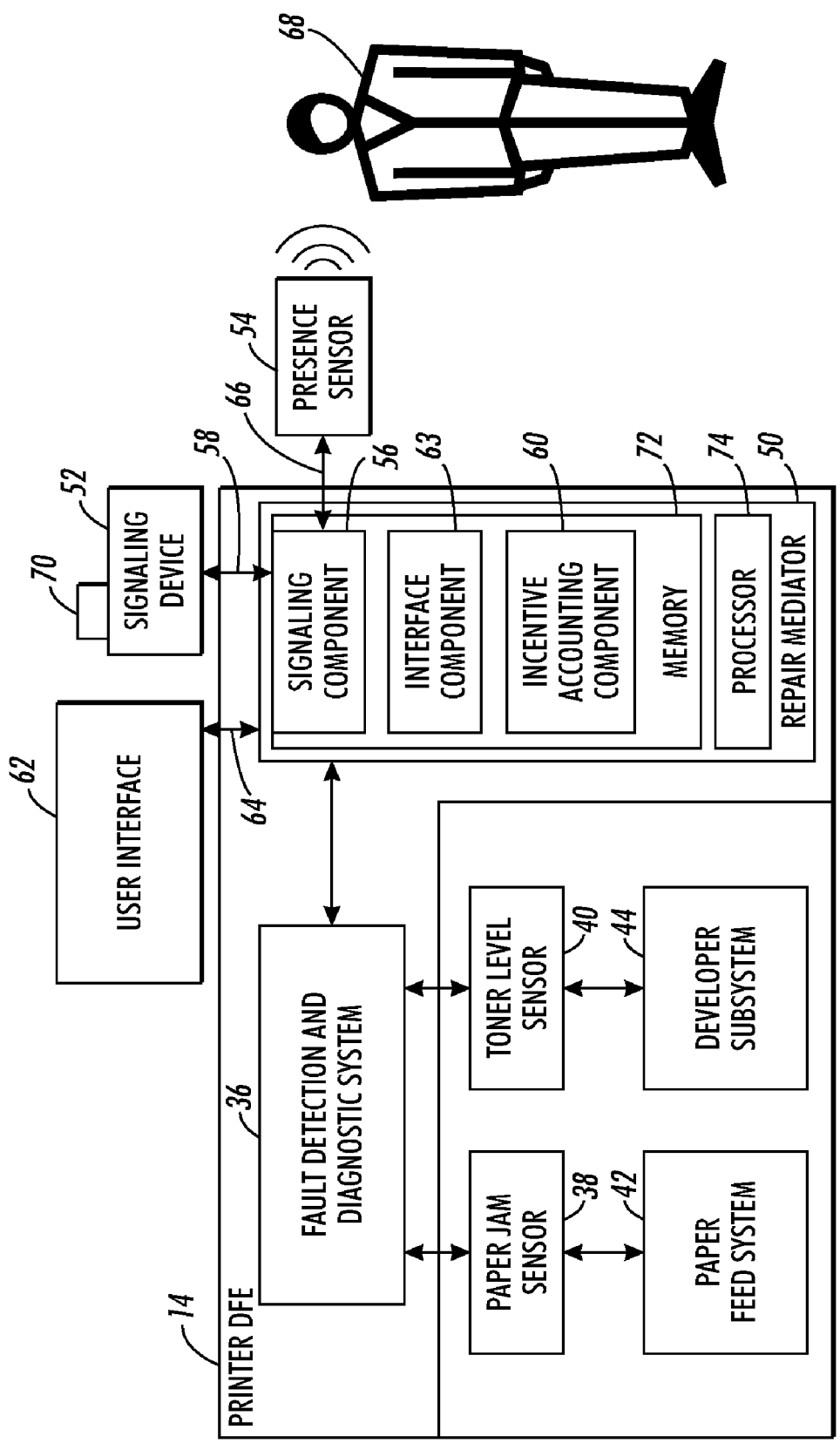
FIG. 2 is a functional block diagram of a printer incorporating a system for soliciting a repair in accordance with a second aspect of the exemplary embodiment.

With reference also to FIG. 2, the exemplary printer 14 is capable of detecting at least some faults which it is incapable of repairing itself without at least some human intervention, and which are within the repair capabilities of at least some of the users of the printer, such as paper jams, consumable replacements, and the like, which will be referred to as addressable faults. In the exemplary printer, a fault detection system 36 receives information from sensors 38, 40, here shown as a paper jam sensor and a toner level sensor. The sensors provide information on the status of respective mechanical and/or electrical components 42, 44 of the printer, here shown as a paper feed system, which delivers sheets of print media to be marked with colorants such as toners, and a developer subsystem which houses the toner to be applied. As will be appreciated, the printer 14 may include any number of sensors of different types. Based on the information received from the sensors, the fault detection system 36 is able to detect and/or diagnose a fault when it occurs. Fault detection systems which may be utilized herein are described, for example, in application Ser. No. 11/522,171, entitled FAULT MANAGEMENT FOR A PRINTING SYSTEM, and the references cited therein. The fault detection system 36 may be resident in the printer, e.g., hosted by the digital front end (DFE) of the printer, or elsewhere in the network, and may be embodied in hardware, software, or a combination thereof.

The exemplary repair system 10 includes a repair mediator 50, a signalling device 52, and, optionally, a presence sensor 54. The repair mediator 50 communicates with the printer's fault detection system 36 and is notified when an addressable fault is detected or receives information from which an addressable fault can be determined. The repair mediator 50 includes a signalling component 56, which causes the printer 14 to broadcast the need for a physical repair. In the exemplary embodiment, the repair mediator 50 communicates with the signalling device 52 via a wired or wireless link 58, and the signalling device provides an audible and/or visual repair signal in response thereto. The signaling device 52 may be a light emitting device such as an incandescent or fluorescent bulb, LED, or the like, or sound emitting device, such as a microphone, or the like. Indeed, any signal perceptible by a human being is usable, provided the repair signal is relatively unobtrusive. For example, the repair signal may be a light, a low hum, a graphical display on a screen, or the like. For example, a red light may be used as the signaling device which is powered only when there is an addressable fault. The users of the printer, or anyone passing by, have been instructed to recognize the repair signal as an indication that the printer has an addressable fault for which an incentive is provided for repair. The signal emitted by the signalling device may have a range of at least about 2 meters such that it is noticeable by passers-by and not just by people attempting to use the printer, and, in general is not perceptible to users while at their workstations 18, 20.

An incentive scheme provides the motivation to passers-by for performing the repair. In the illustrated embodiment, the repair mediator 50 includes an incentive accounting component 60 which provides a reward to the performer of the repair or to a recipient designated by the repairer. To link the reward to the repairer, a user interface 62 on the printer or local thereto allows the repairer to identify himself or indicate the recipient of the reward. The user interface 62 is communicatively linked to an interface component 63 of the repair mediator 50, for example, via a wired or wireless link 64. The user interface 62 can be, for example, a graphical user interface, touch screen, keyboard, or keypad. The repairer types or otherwise submits a user identifier such as his PIN, an employee number, or that of a designated recipient (e.g., a charity or a group of co-workers) on the interface 62. Alternatively, the repairer inserts a memory stick or other data storage device which carries the identifier, into an appropriate input port of the printer. Alternatively, the repairer carries an RFID badge or the like, from which the identifier can be read by the printer. The interface 62 may also be used to convey information to the candidate repairer on the nature of the fault, steps involved in the repair, and whether the repair has been successful.

To ensure that a repair has been performed, the repair mediator 50 recognizes when a repair has been performed successfully before issuing the reward. For example, the printer 14 is able to detect that it is in a good operational state (or is absent a need for an addressable repair). The fault detection system 36 may communicate that it is in this state to the repair mediator and the incentive accounting component thereupon issues the reward.

To reduce the intrusiveness of the repair signal, a presence sensor 54 may be provided on or local to the printer and communicatively linked via a wired or wireless link 66 to the repair mediator 50. The presence sensor 54 detects the presence of a person 68 at or near the printer. The presence sensor is thus able to detect passers-by who are within the perceptible range of the repair signal. When the presence sensor 54 detects that a person is near the printer, the repair signal is generated, while at other times, the signal may be switched off or be more discrete. The presence sensor 54 may be, for example, a heat sensor capable of detecting body heat, a motion sensor capable of detecting the motion of a person, a light sensor capable of detecting a change in light intensity or color when a person passes by, or the like. In another embodiment, the presence sensor 54 detects a signal transmitted by a transmitter carried by a person 68. In general, the presence sensor 54 has a relatively short range so that it only detects people close to the printer. Additionally, the printer may have a disable button 70, which allows someone to switch off the repair signal, for example, if the candidate repairer 68 is unable to perform the repair. In this case, the printer 14 may summon an administrator or make an automated call for a service technician.

The repair mediator 50 may be in the form of software, hardware or a combination thereof. In one embodiment, the components 56, 60, 63 of the repair mediator 50 are in the form of software instructions stored in memory 72 and are executed by an associated processor 74. In the embodiment illustrated in FIG. 2, the repair mediator 54 is hosted by the printer's digital front end (DFE) and the instructions are executed by the DFE's central processing unit (CPU).

In other embodiments, the repair mediator 50, or one or more components thereof, may be remote from the printer 14, e.g., located on a central server 76 which is accessible to the network printers 14, 16 via the network 22, as shown in FIG. 1, or accessible via a link such as a wired or wireless link or telephone line. In other embodiments, the repair mediator may be hosted by a website of the printer manufacturer and accessed by the Internet. In these embodiments, a single repair mediator 50 may serve two or more printers 14, 16.

The memory 72 may represent any type of computer readable medium such as random access memory (RAM), read only memory (ROM), magnetic disk or tape, optical disk, flash memory, or holographic memory. In one embodiment, the memory 72 comprises a combination of random access memory and read only memory. In some embodiments, the processor 74 and memory 72 may be combined in a single chip. Memory 72, or a separate memory, stores instructions for performing the exemplary method as well as a record of the repair, such as the ID of the candidate repairer and/or designated reward recipient, the time of the repair, whether the repair was successful, and the reward granted.

The incentive can be of any kind which is sufficient to modify behaviour with respect to performing repairs. The reward may be in the form of points which are redeemable by the repairer or the repairer's designated recipient for a tangible or intangible reward. The tangible reward may be a monetary award or other gift of value. In another embodiment, the reward is in the form of an opportunity to enter a drawing for a monthly prize or other prize. If the printer is one which charges printing to the users, the reward can be in the form of a number of free prints. If users value having their jobs advanced in a print queue, the reward may provide for advancing one or more future print jobs out of print job order. For example, the reward may be in the form of a tangible or intangible priority voucher which provides that the few next print jobs of the repairer will be processed prior to other jobs in the print queue, e.g. for a certain time or certain number of pages/jobs. In another embodiment, the reward is in the form of recognition for the repairer. A recognition system may be employed, where repairers are recognized for their contribution, such as in a "Repairer Hall of Fame". In some cases, a recipient may be designated to receive the reward, such as a charity. Or, a group of co-workers may collectively receive points towards a particular goal. In one embodiment, the reward consists of a value stored in memory which is retrievable by a reward issuer, such as an administrator of the organization, who then provides the recipient with a tangible reward.

The incentive may be varied, for example, to tune the incentive to the response rate or to maintain interest. Users may be notified by email of the reward scheme and subsequently, of a change to the reward scheme. In some embodiments, the repairer may be allowed to select a reward type from a set of reward types, such as charitable donation, personal reward points, free prints, and the like.

As is the case with many incentive systems, some care should be taken with respect to possible cheating, e.g., a user may force a breakdown (e.g., misfeeding paper to cause a paper jam) in order to repair it multiple times and receive multiple rewards. Several mechanisms can be designed to avoid cheating. In one embodiment, a repair warranty may be used to guarantee a repair. A repair may be warranted for a certain time, e.g. 10 minutes. During the warranty time, the repairer receives no reward for further repairs. In the case of an anonymous repair with the reward going to a designated recipient, such as a charity program or group of employees, a similar rule may apply, i.e., there is a period of time without a reward after a repair. In one embodiment, a maximum reward total cost per day, or other time period, may be established. In other embodiments, a maximum reward per repairer or per designated recipient in a given time period may be established. Once the particular maximum is reached, no further rewards are issued until the end of the time period. The candidate repairer may be notified, e.g., via the user interface, if the maximum has been reached, so that he is aware that there will not be a reward for repairing the printer.

Accounting can be performed locally on the printer by the incentive accounting component 60, with the option of printing a balance from the machine. In one embodiment, repairers may receive a digitally signed repair receipt after each repair. The repairer can then submit the receipt to the appropriate accounting person to claim the reward. In other embodiments, the printer 14 may periodically send the repair information, e.g. via the network 22 or the Internet, to a central depository, such as server 76, where the information is accessible to the accounting person. Alternatively, the printer memory 72 may be accessible via the network.

Figure 3:
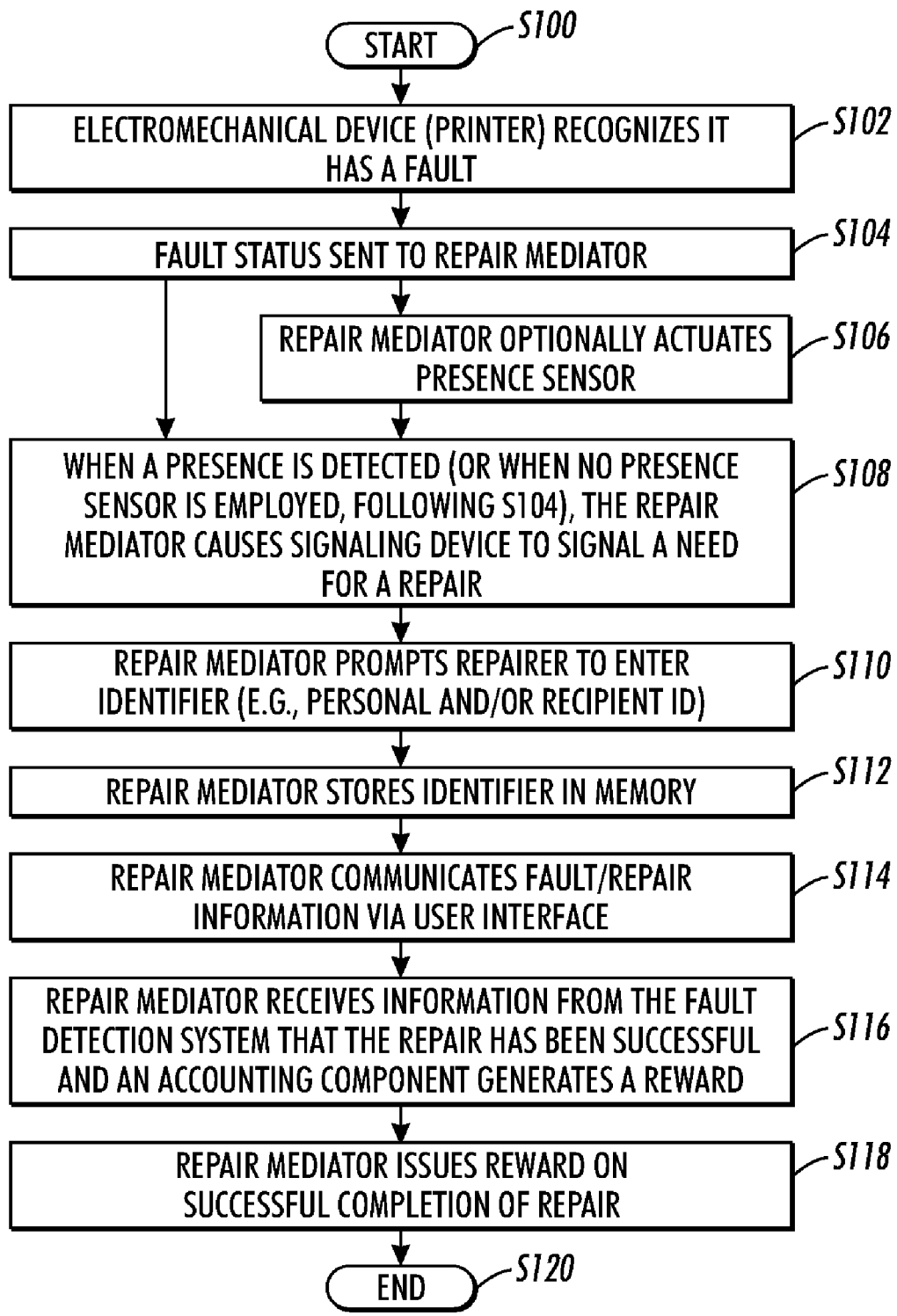
FIG. 3 is a flow chart illustrating a method for soliciting a repair in accordance with a second aspect of the exemplary embodiment.

FIG. 3 illustrates an automated method for soliciting a repair to an electromechanical device, such as a printer. The method begins at S100.

At S102, a printer recognizes that it has an addressable fault.

At S104, the fault state is communicated to the repair mediator.

At S106, the repair mediator may actuate the presence sensor, if one is provided, and the presence sensor provides a signal to the repair mediator when the presence of a passer-by is detected.

At S108, the repair mediator signals a need for a repair, either upon receipt of the fault state information, or, if a presence sensor is employed, only when the presence of a passer-by is detected.

At S110, the repair mediator prompts the candidate repairer to enter a user identifier (e.g., a personal identifier and/or a recipient identifier).

At S112, the repair mediator receives the user identifier from the candidate repairer and stores it in memory. The repair mediator terminates the repair signal at this point, or later, such as when the repair is completed.

At S114, the repair mediator may communicate information to the candidate repairer, such as the nature of the fault or what actions are needed to complete the repair, e.g., via the printer's GUI.

At S116, if the repairer has successfully performed the repair, the repair mediator receives information from the fault detection system that the repair has been successful and the accounting component issues the reward. As will be appreciated, the input of the repairer's identifier (step S110), may be performed after the repair has been successfully completed, such as during or after S116.

At S118, the repairer may be notified of the reward via the GUI, and/or by a printed receipt.

The method ends at S120.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for soliciting a repair.

The repairs performed by passers-by can decrease the cost of ownership to the customer, even factoring in the rewards. Additionally, the reduction in the annoyance costs of a printer being unavailable when an urgent job is needed is also a factor for customers. Further, fixing a problem at a convenient time of the day and with a small associated reward can be a positive experience for the repairers. Provided that the non-trained passers-by are able to perform at least some repairs and the incentive to do so provided by the incentive scheme is sufficiently attractive, such benefits can be achieved. An organisation may tune the repair cost savings to the incentive cost.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for soliciting repairs to an electromechanical device comprising:
   a signaling device for signaling a need for a repair to an associated electromechanical device; and
   a repair mediator which receives information related to an addressable fault with the electromechanical device and causes the signaling device to provide a signal indicating, to candidate repairers passing by the electromechanical device, the need for the repair to the device for which a reward is available to a candidate repairer for performing the repair, candidate repairers including not only users of the device but anyone passing by the electromechanical device, the repair mediator detecting a completion of the repair and providing the reward for the completed repair to the repairer or to a recipient designed by the repairer, wherein the repair mediator provides the reward for the completed repair by linking the reward to the repairer performing the repair.

2. The system of claim 1, wherein the electromechanical device comprises a printer.

3. The system of claim 1, wherein the electromechanical device includes a fault detection system communicatively linked with the repair mediator and wherein the fault detection system provides the information related to the addressable fault.

4. The system of claim 1, further comprising a presence sensor for detecting the presence of a person passing by, the presence sensor being communicatively linked to the repair mediator, the presence sensor detecting passers-by who are within the perceptible range of a repair signal, whereby when the presence sensor detects that the person is near the electromechanical device, the repair signal is generated, while at other times, the signal is switched off or is more discrete.

5. The system of claim 1, wherein the signaling device generates at least one of an audible signal and a visual signal which is perceptibly by a person passing by the electromechanical device.

6. The system of claim 1, wherein the repair mediator includes an accounting component which generates a record of the reward and its recipient and stores the record in associated memory.

7. The system of claim 1, wherein the reward comprises at least one of the group consisting of:
   a number of free prints;
   a priority voucher for advancing future print jobs out of print job order;
   a designated monetary award;
   a tangible gift of value;
   a number of points towards a designated reward;
   a printed receipt which is exchangeable, alone or in combination with other receipts, for the designated reward;
   an opportunity to participate in a drawing for the reward;
   a donation to a charity;
   an opportunity to receive a recognition, based on the performance of the repair and optionally other repairs;
   a stored value which is retrievable by a reward issuer; and
   combinations thereof.

8. The system of claim 1, further comprising a user interface communicatively linked with the repair mediator, the user interface configured for receiving a user identifier input by the repairer and communicating the user identifier to the repair mediator.

9. The system of claim 8, wherein the user interface provides information to the repairer concerning the addressable fault or instructions for repair.

10. The system of claim 1 wherein the addressable fault is of a type which is repairable by at least some users of the electromechanical device.

11. The system of claim 1, wherein the addressable fault comprises at least one of a requirement for a consumable replacement and a paper jam.

12. The system of claim 1, wherein the repair mediator comprises software instruction stored in memory and a processor which executes the instructions.

13. A printer comprising the system of claim 1.

14. The printer of claim 13, wherein the printer comprises a fault detection system in communication with the repair mediator.

15. A printing network comprising at least one printer and the system of claim 1.

16. The system of claim 1, wherein the repair mediator obtains identification of the repairer performing the repair in order for the repair mediator to link the reward to the repairer.

17. A computer implemented method for soliciting a repair of an electromechanical device comprising:
   automatically detecting an addressable fault with an electromechanical device; in response to the detection,
   automatically signaling to persons passing by the electromechanical device to indicate a need for a repair to the electromechanical device for which a reward is available to passers-by and not just by people attempting to use the electromechanical device,
   detecting a completion of the repair and providing for the reward to be linked to a passer-by performing the repair by allowing identification of the passer-by; and
   providing the reward to the identified passer-by or to a recipient designated by the passer-by who completes the repair.

18. The method of claim 17, wherein the signaling includes generating at least one of a visual and an audible signal.

19. The method of claim 17, further comprising detecting the presence of a person passing by the electromechanical device, and, in response to the detection, automatically signaling to the person passing by the electromechanical device to indicate the need for the repair to the electromechanical device for which the reward is available.

20. The method of claim 17, further comprising storing a record of at least one of a user identifier and a reward recipient in memory.

21. The method of claim 17, further comprising establishing a repair guarantee which sets a time until which a second reward is not provided to the passer-by who completes the repair or a reward recipient designated to receive the reward.

22. The method of claim 17, further comprising receiving a user identifier input by the passer-by and storing the identifier in memory for identifying the passer-by entitled to receive the reward or designate a reward recipient.

23. A computer program product encoding instructions, which when executed on a computer causes the computer to perform the method of claim 17.

24. A system for soliciting repairs to an electromechanical device comprising:
- a signaling device for signaling a need for a repair to an associated electromechanical device; and
- a repair mediator which receives information related to an addressable fault with the electromechanical device and causes the signaling device to provide a signal indicating, to candidate repairers passing by the electromechanical device, the need for the repair to the device for which a reward is available to a candidate repairer for performing the repair, candidate repairers including not only users of the device but anyone passing by the electromechanical device, the repair mediator detecting a completion of the repair and providing the reward for the completed repair to the repairer or to a recipient designated by the repairer, wherein the repair mediator provides the reward for the completed repair by linking the reward to the repairer performing the repair, wherein the reward is associated with a repair guarantee, which prevents further rewards being issued to the repairer or the designated recipient of the repairer for a predetermined period of time.

* * * * *